US009716585B2

(12) United States Patent
Arnold et al.

(10) Patent No.: US 9,716,585 B2
(45) Date of Patent: *Jul. 25, 2017

(54) CIPHER TEXT TRANSLATION

(71) Applicant: International Business Machines Corporation, Armonk, NY (US)

(72) Inventors: Todd W. Arnold, Charlotte, NC (US); Elizabeth A. Dames, Harrisburg, NC (US); Mark D. Marik, Denver, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,372

(22) Filed: Apr. 12, 2016

(65) Prior Publication Data
US 2016/0226659 A1 Aug. 4, 2016

Related U.S. Application Data

(63) Continuation of application No. 13/542,841, filed on Jul. 6, 2012, now Pat. No. 9,369,274.

(51) Int. Cl.
*G06F 12/14* (2006.01)
*H04L 9/06* (2006.01)
(Continued)

(52) U.S. Cl.
CPC ........ *H04L 9/0618* (2013.01); *G06F 21/6209* (2013.01); *H04L 9/088* (2013.01)

(58) Field of Classification Search
CPC ..... G06F 21/00; H04L 9/0687; H04L 9/0606; H04L 9/0637
(Continued)

(56) References Cited

U.S. PATENT DOCUMENTS 6,333,983 B1  12/2001  Enichen et al.
6,986,043 B2  1/2006  Andrew
(Continued)

OTHER PUBLICATIONS

Paul et al, A Fast and Secure Encryption Algorithm for Message Communication, Dec. 22, 2007, IEEE, pp. 629-634.*
(Continued)

*Primary Examiner* — Christopher Brown
*Assistant Examiner* — Jenise Jackson
(74) *Attorney, Agent, or Firm* — Cantor Colburn LLP; Steven Chiu

(57) ABSTRACT

An aspect of cipher text translation includes a memory configured to store predetermined conditions for performing an encryption operation, and a processor communicatively coupled to the memory. The processor is configured to execute computer readable instructions. The computer readable instructions include determining through analysis of an inbound key and an outbound key of the encryption operation that the encryption operation includes a translation from a first class of encryption to a second class of encryption. The second class of encryption is determined to be weaker than the first class of encryption. The instructions also include applying the predetermined conditions to the input key and the output key and authorizing the translation via the processor, based on the applying, when aspects of the predetermined conditions are satisfied.

14 Claims, 7 Drawing Sheets

(51) Int. Cl.
  *G06F 21/62* (2013.01)
  *H04L 9/08* (2006.01)
(58) Field of Classification Search
  USPC ........................................................ 713/189
  See application file for complete search history.

(56) References Cited

U.S. PATENT DOCUMENTS

| | | | |
|---|---|---|---|
| 8,155,306 B2 | 4/2012 | Brickell | |
| 8,533,494 B2* | 9/2013 | Harada | G06F 21/78 713/185 |
| 8,555,053 B1* | 10/2013 | Vitalo | G06F 13/382 710/62 |
| 2002/0023209 A1* | 2/2002 | Domstedt | H04L 9/08 713/160 |
| 2004/0136533 A1* | 7/2004 | Takagaki | H04L 9/0891 380/255 |
| 2005/0060553 A1* | 3/2005 | Allen | H04L 63/0869 713/182 |
| 2005/0157879 A1* | 7/2005 | Tanaka | H04L 9/0625 380/255 |
| 2005/0198490 A1* | 9/2005 | Jaganathan | H04L 9/06 713/151 |
| 2006/0034459 A1* | 2/2006 | Uchikawa | G06F 21/6209 380/255 |
| 2007/0058814 A1* | 3/2007 | Robinson | H04L 9/0662 380/280 |
| 2007/0079140 A1* | 4/2007 | Metzger | G06F 21/6227 713/189 |
| 2007/0271360 A1* | 11/2007 | Sahita | G06F 21/577 709/223 |
| 2009/0010430 A1* | 1/2009 | Tada | H04N 21/23431 380/217 |
| 2010/0031015 A1 | 2/2010 | Hamamura et al. | |
| 2013/0223278 A1* | 8/2013 | Inada | H04L 41/0816 370/254 |

OTHER PUBLICATIONS

Libert et al, Unidirectional Chosen-Ciphertext Secure Proxy Re-Encryption, Mar. 2011, IEEE, vol. 57, No. 3, pp. 1786-1802.*
CCA Basic Services Reference and Guide for the IBM 4765 PCIe and IBM 4764 PCI-X Cryptographic Coprocessors, Chapter 6, pp. 360-383 (2011).
Knudsen et al., Construction of Secure and Fast Hash Functions Using Nonbinary Error Correcting Codes, Sep. 2002, IEEE, Vo. 48, No. 9, pp. 2524-2539.
Srivastave at al., Security Aspects of the Extended Playfair Cipher, 2011, IEEE, pp. 144-147.
System Cryptographic Architecture, Cryptographic Facility Release 2.0-5.1.1.9 Translate Cipher Text, p. 143 (1996).
Transaction Security System Basic CCA Cryptographic Services SA34-2362- Cipher_Text_Translate (CSNBCTT), Chapter 6, p. 6-7 (1997).
U.S. Appl. No. 13/542,841; Final Office Action, filed Jul. 6, 2012; Date Mailed: Oct. 5, 2015; 13 pages.
U.S. Appl. No. 13/542,841; Non-Final Office Action: filed Jul. 6, 2012; Date Mailed: Mar. 12, 2015; 16 pages.

* cited by examiner

CIPHER TEXT TRANSLATION

DOMESTIC PRIORITY

This application is a continuation of U.S. patent application Ser. No. 13/542,841, filed Jul. 6, 2012, the content of which is incorporated by reference herein in its entirety.

BACKGROUND

The present disclosure relates to performing cipher text translation, and in particular to transforming cipher text from one encryption type or mode to another.

Encryption keys are created and may be given attributes which indicate how they will be used. Keys may be used for operations such as data encryption and decryption, message authentication, key wrapping, and other operations. Keys are categorized in different classes based on the intended use of the keys. Keys may be changed or destroyed when they are no longer needed, when they have been compromised, when they have expired, or when they no longer have a strong security status. When cipher text requires updating to be encrypted under a new encryption key or to change its format, the changes must be performed securely to maintain the security of the cipher text.

In one example of using keys in enciphering and deciphering operations, a cipher text translate (CTT) operation deciphers an arbitrary number of 64-bit cipher text blocks under an inbound triple data encryption standard (TDES) key with a provided inbound initial chaining vector creating clear text (also referred to as "cleartext"). The output of the decryption operation is clear text which is re-enciphered under a provided outbound TDES key with a provided outbound initial chaining vector. The output of the re-enciphering operation is re-enciphered text under the outbound TDES key. In this operation, both the inbound key and the outbound key are of the same enciphering type.

Another conventional methodology of decrypting cipher text and subsequent re-encipherment of the cleartext, includes performing two separate and distinct operations. In the first operation, the cipher text is decrypted to clear text, and in the second operation the cleartext is encrypted back into cipher text without state history linking or coupling the two operations together. One shortcoming of this form of methodology is that the re-encipherment may occur with a weaker key resulting in less secure data, unbeknownst to a user, such as a user requesting the re-encipherment. No past history of the decryption key in the decrypt step is saved, so the knowledge about the strength of the key used to decrypt the cipher text is lost by the time the re-encipherment occurs.

These methodologies may require multiple separate operations, may allow weakening of cipher text security with or without user knowledge, may change an encryption key to only a same type of key, and may not take into account padding of cipher text, which may be required in some translation operations.

SUMMARY

Exemplary embodiments include a system for cipher text translation. The system includes a memory configured to store predetermined conditions for performing an encryption operation, and a processor communicatively coupled to the memory. The processor is configured to execute computer readable instructions. The computer readable instructions include determining through analysis of an inbound key and an outbound key of the encryption operation that the encryption operation includes a translation from a first class of encryption to a second class of encryption. The second class of encryption is determined to be weaker than the first class of encryption. The instructions further include applying the predetermined conditions to the input key and the output key, and authorizing the translation via the processor, based on the applying, when aspects of the predetermined conditions are satisfied.

Additional exemplary embodiments include a computer program product including a computer readable storage medium having computer readable instructions stored thereon that, when executed by a processor implements a method. The method includes analyzing, by the processor, an inbound key and an outbound key of an encryption operation. The method further includes determining, by the processor, that the encryption operation includes a translation from a first class of encryption to a second class of encryption based on the analyzing the inbound key and the outbound key. The method further includes determining, by the processor, whether the translation is permitted based on predetermined conditions.

Further exemplary embodiments include a computer-implemented method, including analyzing, by a processor, an inbound key and an outbound key of an encryption operation. The method includes determining, by the processor, that the encryption operation includes a translation from a first class of encryption to a second class of encryption based on the analyzing the inbound key and the outbound key. The method further includes determining whether the translation is permitted based on predetermined conditions.

Additional features and advantages are realized by implementation of embodiments of the present disclosure. Other embodiments and aspects of the present disclosure are described in detail herein and are considered a part of the claimed invention. For a better understanding of the embodiments, including advantages and other features, refer to the description and to the drawings.

BRIEF DESCRIPTION OF THE DRAWINGS

The subject matter which is regarded as encompassing embodiments of the present disclosure is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

As encryption keys are changed or updated, the cipher text must be maintained secure during the process of changing or updating the cipher text. Disclosed embodiments relate to translating cipher text encrypted under cipher keys from one encryption type to another and controlling permissions for decreasing encryption strength.

Figure 1:
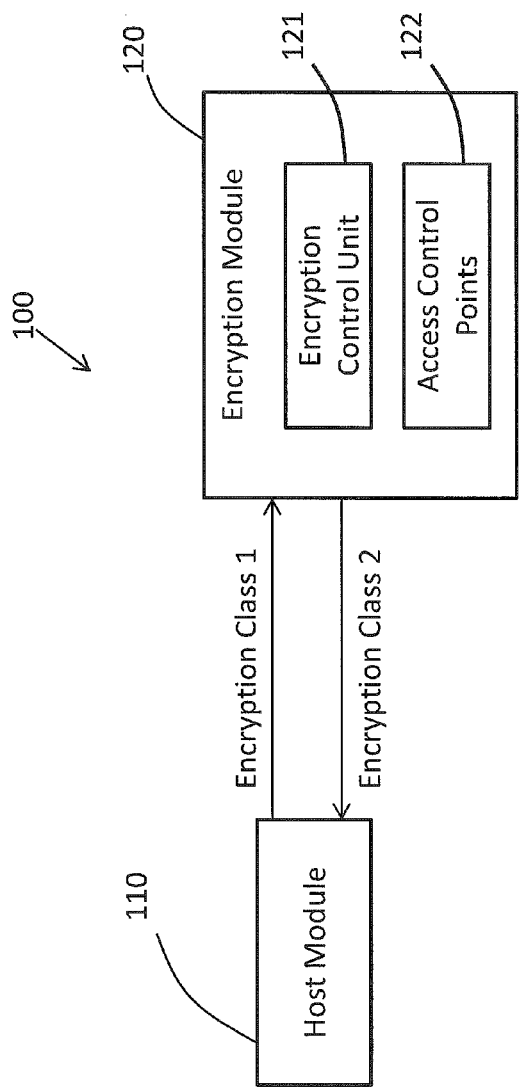
FIG. 1 illustrates a block diagram of an encryption system according to one embodiment of the present disclosure.

FIG. 1 is a block diagram of an encryption system 100 according to an embodiment of the present disclosure. The system 100 includes a host module 110 and an encryption module 120. The encryption module 120 includes an encryption control unit 121 and access control points 122 (ACPs). Access control points may be generic to the encryption module 120, or separate access control points may be defined for individual users of the encryption module. The host module 110 may include a program executed by a processing circuit or may include a computer including processor, memory, logic, and other circuitry configured to access and execute programs. The programs may include data, such as clear text data ("cleartext") that is required to be encrypted by the encryption module 120, or encrypted data that is required to be re-encrypted by the encryption module 120.

The encryption module 120 may include a program stored in memory or may comprise hardware, such as an encryption device. In one embodiment, the encryption module 120 is a crypto card, such as a cryptographic coprocessor by International Business Machines (IBM) TM, having a tamper-resistant housing, processor and other circuitry to connect to a computing device and communicate with the computing device to perform encryption operations of data indicated by the computing device. One example of a crypto card according to an embodiment of the present disclosure is the IBM 4765 PCIe Cryptographic Coprocessor. The ACPs 122 may include software, hardware, or a combination of software and hardware defining Boolean values which indicate whether authorization of certain types of translations is provided.

In operation, the host module 110 may use an application program interface (API) to request that the encryption module 120 perform an encryption operation. The host module 110 may supply cipher text of a first encryption type or class (encryption class 1) to the encryption module 120. The first encryption class may include any encryption type, such as DES, triple DES (TDES), advanced encryption standard (AES) or any other type of encryption.

The encryption module 120 may receive the cipher text of the first class and modify or change the encryption class to a second encryption class (encryption class 2). The second encryption class may be a different encryption algorithm type from among the types DES, TDES, or AES, or may include a same type (i.e. DES, TDES, or AES) having different characteristics, such as encryption keys of a different size. While some examples of specific types or classes of encryption keys or algorithms have been provided by way of example, embodiments of the present disclosure encompass any type or class of encryption keys, algorithms or systems.

In one embodiment, a message transmitted to and from the encryption module 120 includes cipher text and the inbound and outbound encryption keys, such as data class keys for encrypting data, and the inbound and outbound initial vectors contained in a chaining vector. The message is processed by the encryption control unit 121 which may include both a microprocessor and an encryption hardware engine. A request block may be built by the microprocessor for use by a direct memory access (DMA) engine of the encryption control unit 121 which transfers the request block to a symmetric key engine of the encryption control unit 121 of the encryption module 120 for decryption. The request block may comprise the inbound key, a descriptor table for the target clear text, and the inbound initial vector obtained from an input chaining vector. Descriptor tables are data structures used by DMA transfers to define the starting address and length of a memory buffer. Descriptor tables are used for source data memory buffers as well as destination memory buffers by DMA hardware. Once the decryption by the hardware symmetric key engine is completed, firmware builds a request block to be used by the symmetric key engine for encryption. The request block consists of an outbound key, a descriptor table for the source clear text, a descriptor table for the target cipher text, and an outbound initial vector obtained from the input chaining vector. Once the encipherment is completed, the new cipher text may be transferred from the encryption module 120 to the host module 110.

In embodiments of the present disclosure, the encryption module 120 may perform one or more tests to control the encryption operation. For example, the encryption control unit 121 may compare the inbound key to the outbound key and determine whether the inbound key is of a different type than the outbound key. The encryption control unit 121 may access the access control points 122 to determine whether the requested translation from one encryption class to another is authorized, and whether the particular translation requested is authorized. For example, if the requested translation is to convert one type of encryption to a weaker type of encryption, the encryption control unit 121 may determine whether an access control point for that purpose within the set of access control points 122 is configured to authorize the weakening of the encryption. In one embodiment, a translation from encryption with an AES type encryption key to encryption with a DES type encryption key having a strength weaker than the AES type encryption key is requested, and the encryption control unit 121 may determine whether an access control point 122 is configured to authorize the weakening of the encryption.

Table 1 illustrates an example of analysis by an encryption control unit 121 of an inbound encryption key for determining whether a change from one type of encryption to another type of encryption is permitted. In the table, each key part may correspond to an 8 byte segment of an encryption key, and the reference letters "A", "B" and "C" correspond to different key material.

TABLE 1

|  | Key Part 1 | Key Part 2 | Key Part 3 | Effective Strength | Translation Allowed |
| --- | --- | --- | --- | --- | --- |
| Key 1 | A | A | A | Single | No |
| Key 2 | A | A | B | Single | No |
| Key 3 | A | B | B | Single | No |
| Key 4 | A | B | A | Double | Yes |
| Key 5 | A | B | C | Triple | Yes |

Based on Table 1, a DES key having a single length (8 bytes) is too weak to allow further weakening of the encryption key by a translation operation. For example, in Key 2, the first and second key parts have the same key material values, and the strength of the key has the effective strength of only a single length key. Referring to Key 4, if the inbound key has the effective strength of a triple length key, the translation may not be allowed by the encryption control unit 121 unless particular access control points 122 are asserted or activated to allow the translation.

In one embodiment, the requested translation includes changing cipher blocks, or segments of data being enciphered and deciphered, from one size to another. The changing of the size of cipher blocks may include changing padding within the cipher blocks, and the encryption control unit 121 may automatically adjust the padding within the output cipher text to accommodate a desired encryption class. Automatic padding adjustment may be predicated upon a padding method being supplied to the encryption module 120. In other words, in one embodiment if no information regarding a padding method of one or more of an inbound cipher text and an output cipher text is supplied to the encryption module 120, no padding adjustment may occur. In addition, specifying a padding option, or providing padding information to the encryption module 120 need not always result in a cipher text length change.

For example, if an input cipher method corresponds to a DES cipher-block chaining (CBC) method and an output cipher method corresponds to a DES X9.23 method, an output cipher text length must be adjusted such that the output cipher text length is greater than or equal to the sum of the length of the input cipher text and a DES block. The additional DES block in the output for this example is dictated by the X9.23 requirement of appending 1 to 8 bytes of padding to the clear text to bring the resultant clear text length up to the next 8 byte multiple in length. Thus if the input CBC mode cipher text was designated as having no padding, then the resultant clear text after decipherment would be a multiple of a DES cipher block. Furthermore, re-encipherment of this resultant clear text under the X9.23 padding method means that exactly 8 bytes of padding would be appended to the clear text, which already consists of an 8 byte multiple in length, prior to the re-encipherment. After re-encipherment, the resultant cipher text will then have a length of 8 byte more than the inbound cipher text.

In another example, if the input cipher method is a DES CBC method and an output cipher method is an AES CBC PKCS padding method, the output cipher text length must be adjusted based on whether the input cipher text is a multiple of an AES block. If the input cipher text is not a multiple of an AES block, the output cipher text length must be greater than or equal to the sum of the input cipher text length and a DES block. Thus in this example, if the input DES cipher text is 8 bytes, the output cipher text must be an AES cipher block, or 16 bytes, which is equal to the sum of the input cipher test length and a DES block. If the input cipher text is a multiple of an AES block, the output cipher text length must be greater than or equal to the sum of the input cipher text length and an AES block. The PKCS padding method dictates 1 to 16 bytes of padding be appended to clear text prior to encipherment. Thus in this example, if the input AES cipher text is 16 bytes (a multiple of an AES block), then 16 bytes of padding must be appended according to the PKCS padding method, bringing the resultant output cipher text length to 32 bytes, which is equal to the sum of the input cipher test length and an AES block.

Although some examples of adjustment of cipher text lengths by adjusting padding of cipher blocks have been provided, it is understood that embodiments of the present disclosure encompass any adjustments of cipher text lengths based on changes in encryption types. In particular, embodiments of the present disclosure encompass any adjustments of cipher text lengths by adjusting padding to accommodate any encryption translation, including AES to DES and vice versa, AES to AES, DES to DES, or any other type of encryption class translation. Embodiments of the present disclosure encompass PKA public keys or as-yet other undefined future key types in other embodiments of the present disclosure.

In embodiments of the present disclosure, an encryption module 120 may control an encryption process including detecting a present encryption type or class and a target encryption type or class and determining whether the encryption class translation is permitted based on predetermined conditions. For example, the predetermined conditions may include determining whether the translation includes a weakening of encryption of a cipher text. In addition, the predetermined conditions may include access points indicating whether a particular type of enciphering is permitted. In addition, the translation may include a change in a cipher block size of cipher text, and the encryption module 120 may automatically adjust padding of the cipher text to accommodate the translation when information regarding a padding method is supplied to the encryption module 120.

In embodiments of the present disclosure, the weakening of encipherment of cipher text may be managed efficiently by analyzing both an inbound key of encrypted inbound cipher text and an outbound key of outbound target cipher text prior to performing a translation operation. Accordingly, undesired translation of cipher text from a strong encipherment to a weaker encipherment may be avoided.

Figure 2:
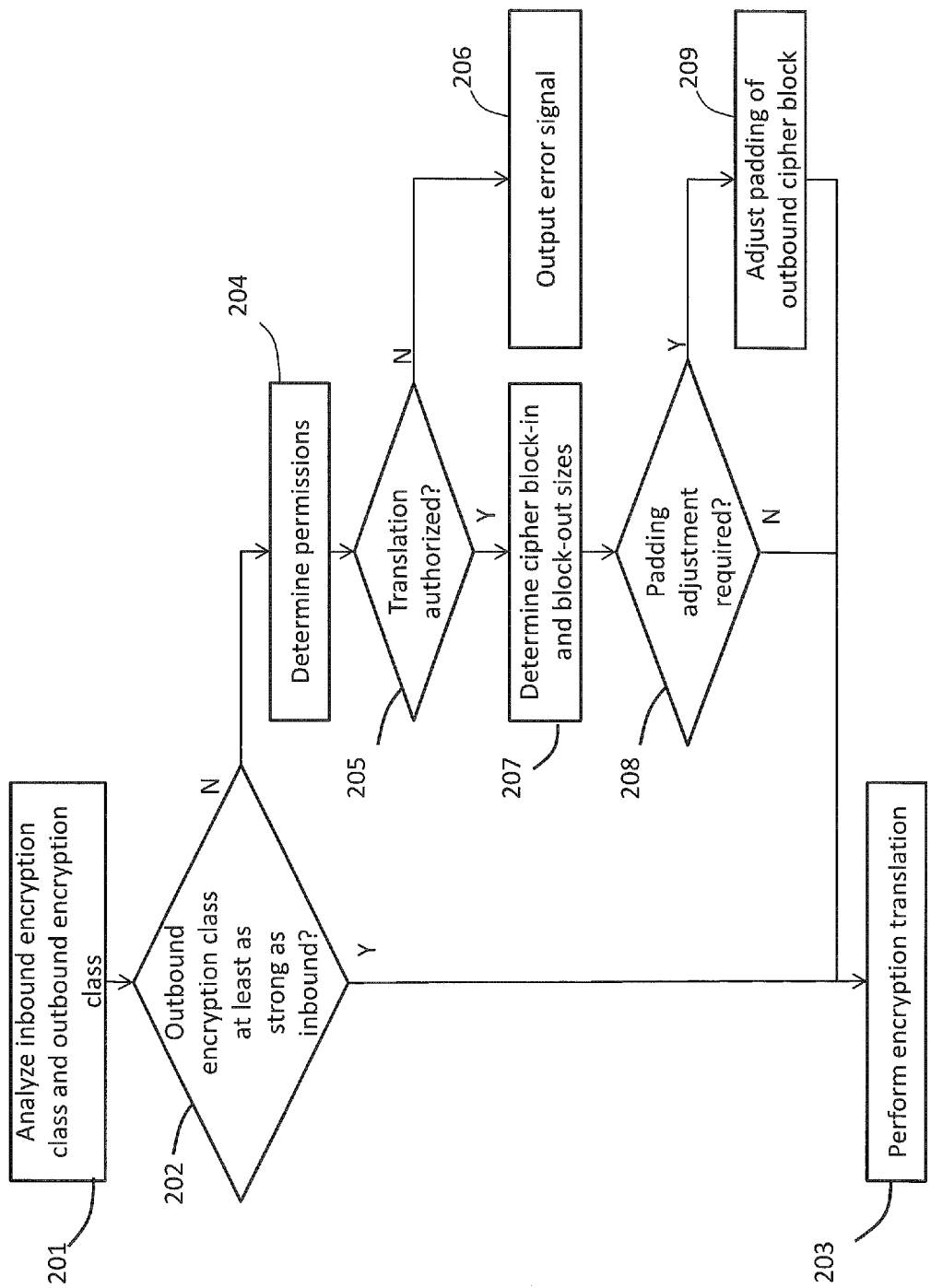
FIG. 2 illustrates a flow diagram of a method according to one embodiment.

FIG. 2 illustrates a method according to one embodiment of the present disclosure. In block 201, an inbound encryption class and outbound encryption class are analyzed. Analyzing the encryption classes may include, for example, analyzing an inbound encryption key and an outbound encryption key. In block 202, it is determined whether the outbound encryption class is at least as strong as the input encryption class. If it is determined that the outbound encryption class is at least as strong as the inbound encryption class, then an encryption translation is permitted and performed in block 203 to change an encryption key of cipher text.

If it is determined in block 202 that the outbound encryption class is weaker than the inbound encryption class, then in block 204 permissions may be determined. For example, access control points (ACP) may be consulted, where the ACPs indicate types of translations that are allowed. In addition, one or more tables may be consulted indicating the strength of an encryption key, such as a DES key, and permissions may be determined based on key parts within the encryption key. In the latter case, a DES key may have 3 key parts of 8 byte lengths each and if for example some key parts are equal, such as key part 1 and key part 3 (see Table 1, Key 4), then the DES key is considered to have an effective double length strength.

In block 205 it is determined whether the translation is permitted based on the determined permissions. If the translation is not authorized, then an error signal may be output in block 206 to indicate that the translation is not permitted. If the translation is authorized in block 205, then cipher block sizes of the inbound and outbound cipher text may be determined in block 207. If it is determined in block 208 that an adjustment of padding of the cipher text is required to perform the translation, then padding of the outbound block may be adjusted to be either added or removed in block 209. The determination of whether padding adjustment is required in block 208 may be based at least in part upon whether one or more of inbound and outbound cipher text padding information is provided to accommodate the outbound encryption class. If neither an inbound padding option is provided nor an outbound padding option is provided to the translation operation, or to an encryption module performing the translation operation, then no adjustment of padding on the output cipher block will be performed. The encryption translation is performed in block 203 when no padding adjustment is required, when no padding information is provided, or after the padding of the outbound cipher block is adjusted.

Figure 3A:
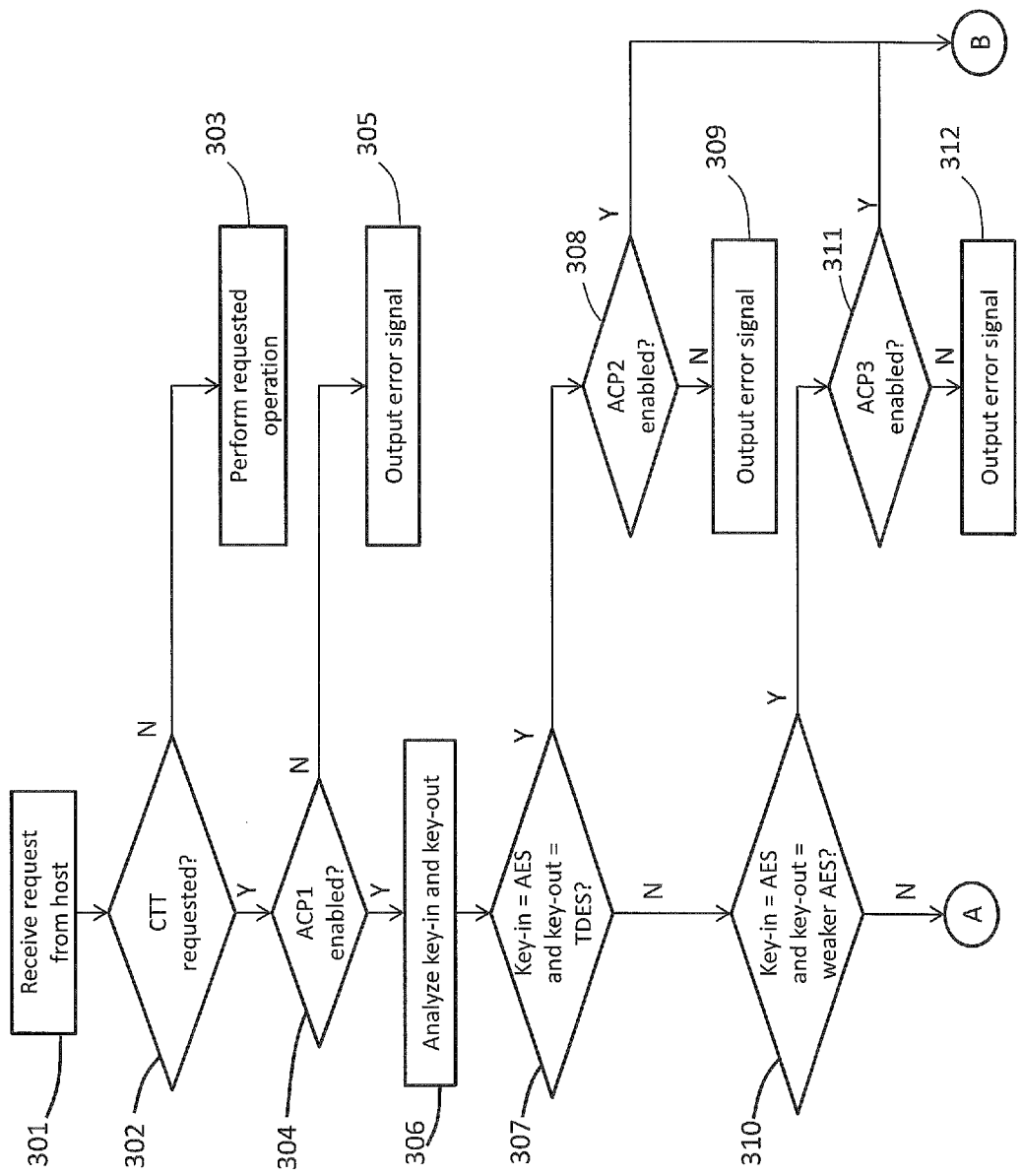
FIGS. 3A and 3B illustrate a flow diagram of a method according to one embodiment.
Figure 3B:
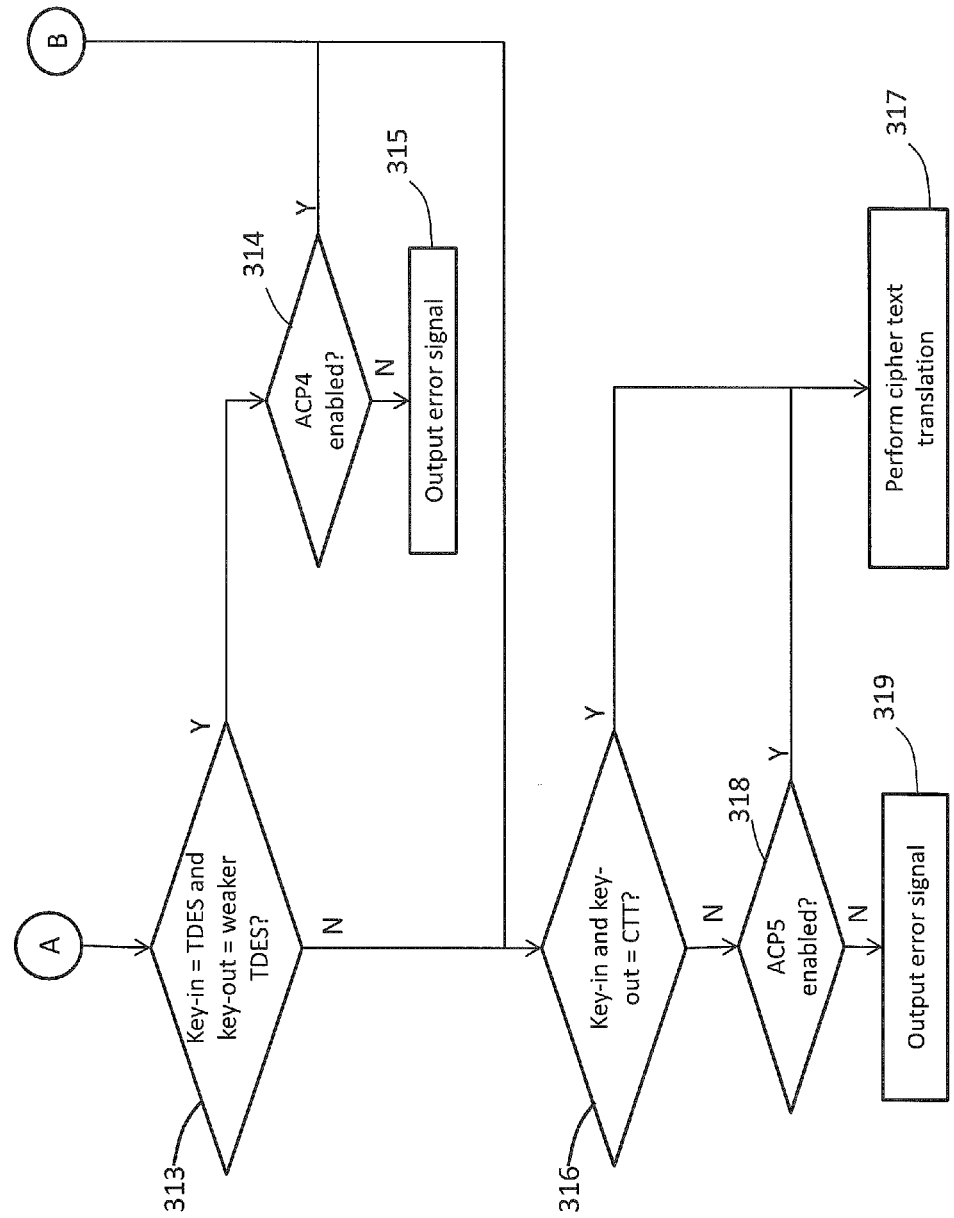

FIGS. 3A and 3B illustrate a method of analyzing an encryption translation according to one embodiment of the present disclosure. In block 301 a request may be generated by a host and received by an encryption module. The request may be a request to initiate an encryption process and may include initiating an application program interface (API) by the host. In block 302, a command code that is part of the request from the host module is analyzed to determine whether the request includes a request to perform a cipher text translate (CTT) function, or a function to change the encipherment of a cipher text from one type or class to another type or class. If no CTT is requested, then the requested operation, such as encipherment, decipherment, or any other requested operation is performed in block 303.

If a CTT operation is requested, then it may be determined in block 304 whether a first access control point (ACP1) is enabled, indicating that a CTT operation may be performed. If it is determined in block 304 that no such translation is permitted, an output error signal 305 may be generated, indicating that a CTT operation is not permitted. On the other hand, if the ACP1 is enabled, then an inbound encryption key and an outbound encryption key may be analyzed and in block 306, and an encryption module may compare the CTT operation indicated by the inbound and outbound encryption keys to one or more pre-defined CTT operations to determine whether the particular CTT operation requested is permitted.

In block 307, it may be determined whether the desired translation corresponds to a first translation. In particular, it may be determined whether the inbound key is an AES key and the outbound key is a TDES key. For example, the TDES key may be a double or triple length TDES key, each of which is weaker than an AES key. If so, then it is determined in block 308 if such a translation is authorized by determining a state of an access control point ACP2. If the access control point ACP2 indicates that this type of translation is not permitted, an output error signal is generated in block 309.

In block 310, it may be determined whether the inbound key is an AES key and the outbound key is a weaker AES key, such as an AES key having fewer bits. For example, the CTT may translate from an AES key having 256 bits to one having 192 or 128 bits, which would not only weaken the strength of the AES key but would also weaken the strength of the encryption of the outbound cipher text. If block 310 is true, or if the inbound key is an AES key and the outbound key is a weaker AES key, then it is determined in block 311 if such a translation is authorized by determining a state of an access control point ACP3. If the access control point ACP3 indicates that this type of translation is not permitted, an output error signal is generated in block 312. Reference letters "A" and "B" of FIG. 3A correspond to reference letters "A" and "B" of FIG. 3B.

In block 313, it may be determined whether the inbound key is a TDES key and the outbound key is a weaker TDES key. For example, the CTT operation may translate from a triple length TDES key to a double length TDES key, which would not only weaken the TDES key but also weaken the strength of the encryption of the output cipher text. If block 313 is true, or if the inbound key is a TDES key and the outbound key is a weaker TDES key, then it is determined in block 314 if such a translation is authorized by determining a state of an access control point ACP4. If the access control point ACP4 indicates that this type of translation is not permitted, an output error signal is generated in block 315. Blocks 307, 310 and 313 represent examples of analyzing inbound and outbound keys to determine whether the outbound key is weaker than, or corresponds to an encryption that is weaker than, the inbound key. While a few examples of such analysis are provided, embodiments of the present disclosure encompass any analysis of inbound and outbound encryption keys to determine whether one represents a weaker encryption than the other. If block 313 is false, then it may be determined that the outbound key is at least as strong as the inbound key, and processing commences to block 316.

In block 316, it may be determined whether the inbound and outbound keys are cipher text translate (CTT) keys only. In other words, it is determined if the inbound and outbound keys are marked for use only with CTT functions, or if the inbound and outbound keys are marked as more generic keys which also allow CTT functions. If it is determined that both the inbound and outbound keys are CTT-only keys, the cipher text translation operation is performed in block 317.

If at least one of the inbound and outbound keys is a generic key that may be used to perform a CTT function, it is determined in block 318 whether the access control point ACP5 is enabled. The access control point ACP5 is activated to permit more generic keys to be used to initiate the CTT function, and the ACP5 is deactivated to permit only translate keys to initiate the CTT function. If ACP5 is enabled, then the cipher text translation is performed in block 317. However, if ACP5 is not enabled, indicating that the CTT operation is restricted to only keys specifically marked for use with a CTT function and no other function, then an output error signal is provided in block 319.

According to embodiments of the present disclosure, encryption operations may be controlled by determining states of access control points of an encryption module or device. By putting ACPs at different settings, the ACPs may control what translation operations may be performed. For example, the ACPs may indicate that some translations that weaken encryption security are permitted while others are not. Accordingly, an encryption module may facilitate translations from one encryption type to another encryption type, and may control which types of translations may be permitted. In addition, controlling the types of translation that are permitted protects data from being converted from a more secure encryption to a less-secure encryption without authorization.

FIGS. 3A and 3B illustrate an embodiment in which the activation of an access control point (ACP) corresponds to allowing one function and the inactivation of the ACP corresponds to disallowing the function. However, embodiments of the present disclosure encompass any configuration of ACPs allowing and disallowing functions. In other words, a system may be configured to allow a function when the ACP is not activated and to dis-allow the function when the ACP is activated. In each embodiment, the ACPs are accessed to determine permissions for performing functions, such as CTT functions.

The present embodiments not only couple the decrypt and encrypt operations together within one operation, but also allow for padding adjustment, allow a mix of algorithm types for inbound and outbound keys, and allow for the key strength of the inbound and outbound keys to be different under certain conditions set forth by the access control points. These embodiments have the ability to determine whether a key being used for the re-encipherment phase is weaker than the key used for the decryption phase, and whether a predetermined access control point allows for translation to commence or not.

Figure 4:
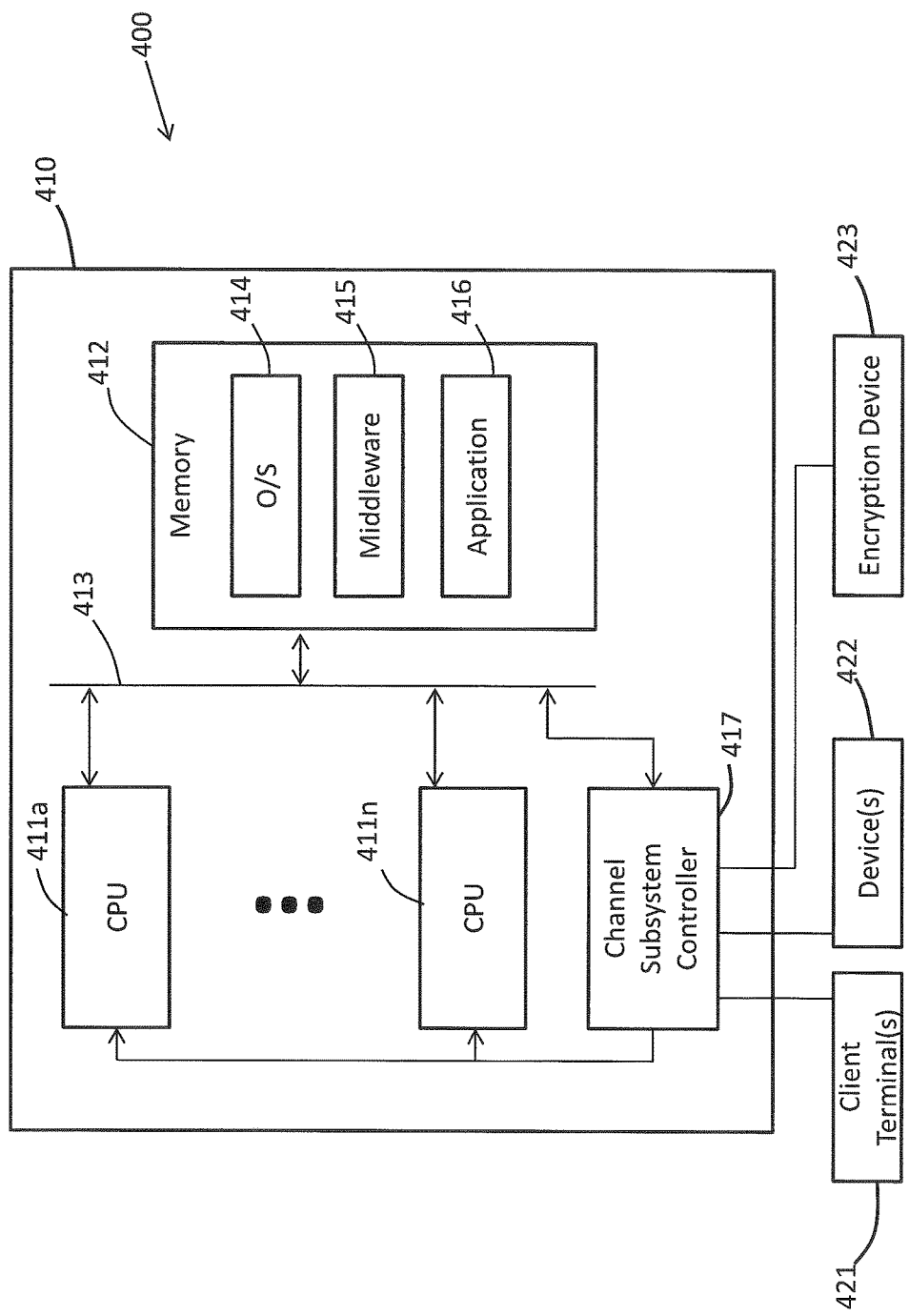
FIG. 4 illustrates a computer system according to one embodiment.

Embodiments of the present disclosure encompass any type of computer system capable of interacting with an encryption device to request encryption operations and process and transmit encrypted data. FIG. 4 illustrates a computer system 400 according to one embodiment of the present disclosure. The computer system 400 may correspond to a mainframe-type computer system in which multiple client terminals may access the mainframe computer and may be managed by the mainframe computer.

The system 400 includes a host computer 410. The host computer 410 includes one or more CPUs 411a-411n configured to access memory 412 via a bus 413. Memory 412 may store an operating system 414, middleware 415, and applications 416. A channel subsystem controller 417 may access external devices, such as client terminals 421 and other devices 422, including printers, display devices, storage devices, I/O devices, or any other device capable of communication with the host computer 410. The channel subsystem controller 417 may access an encryption device 423 to initiate encryption operations, such as performing a translation operation to translate an encryption type from one class to another. For example, an encryption key may be changed in a same encryption type to a key having a stronger or weaker encryption strength. In addition, an encryption key may be changed from one type to another. The encryption device 423 may correspond to the encryption module 120 of FIG. 1.

In some embodiments, as each client terminal 421 accesses the host computer 410, one or more CPUs 411a-411n may be designated to correspond to the client terminal 421, and instances of the O/S 414, middleware 415, and applications 416 may be opened to interact with separate client terminals 421, such as by creating virtual computers corresponding to each client terminal 421 within the host computer 410.

Figure 5:
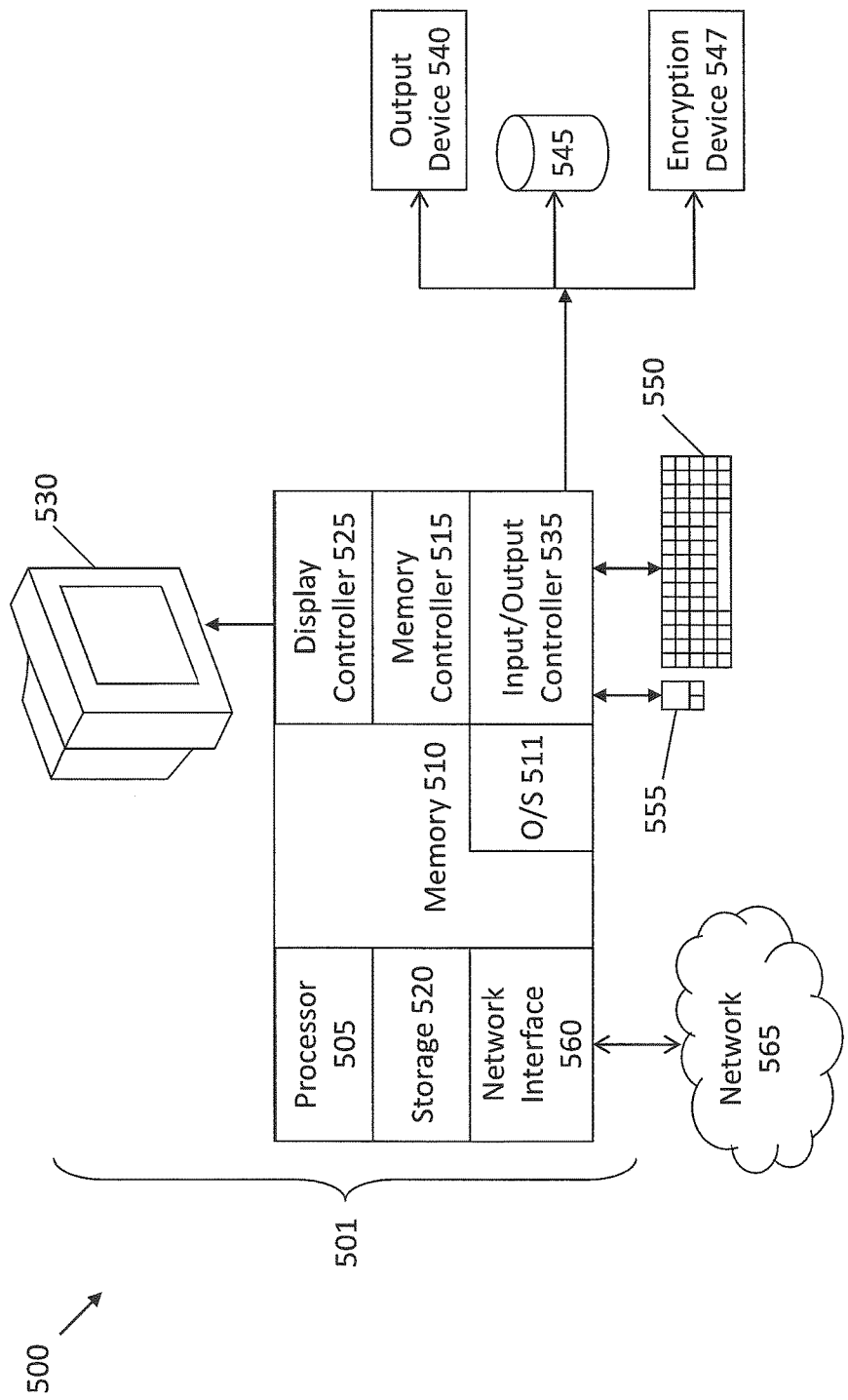
FIG. 5 illustrates a computer system according to another embodiment.

FIG. 5 illustrates a block diagram of a computer system 500 according to another embodiment of the present disclosure. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore may include general-purpose computer or mainframe 501 capable testing the reliability of a base program by gradually increasing a workload of the base program over time.

In an exemplary embodiment, in terms of hardware architecture, as shown in FIG. 5, the computer 501 includes a one or more processors 505, memory 510 coupled to a memory controller 515, and one or more input and/or output (I/O) devices 540, 545 (or peripherals) that are communicatively coupled via a local input/output controller 535. The input/output controller 535 can be, for example, one or more buses or other wired or wireless connections, as is known in the art. The input/output controller 535 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include, for example, fiber-optic communications ports.

In one embodiment, the input/output controller 535 is connected to an encryption device 547, which may correspond, for example, to the encryption module 120 of FIG. 1.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (O/S) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 501 is in operation, the processor 505 is configured to execute instructions stored within the memory 510, to communicate data to and from the memory 510, and to generally control operations of the computer 501 pursuant to the instructions.

In an exemplary embodiment, the methods of managing memory described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
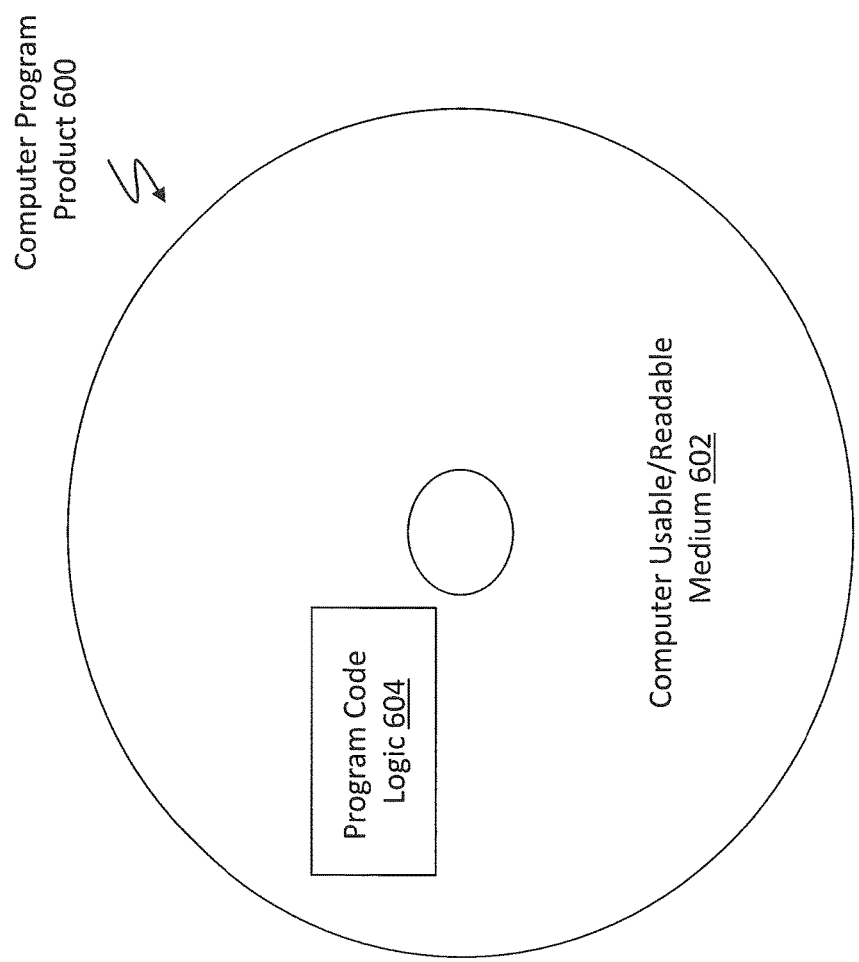
FIG. 6 illustrates a computer-readable medium according to one embodiment.

As described above, embodiments can be embodied in the form of computer-implemented processes and apparatuses for practicing those processes. An embodiment may include a computer program product 600 as depicted in FIG. 6 on a computer readable/usable medium 602 with computer program code logic 604 containing instructions embodied in tangible media as an article of manufacture. Exemplary articles of manufacture for computer readable/usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the embodiments. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the embodiments. When implemented on a general-purpose microprocessor, the computer program code logic 604 segments configure the microprocessor to create specific logic circuits.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

While preferred embodiments have been described above, it will be understood that those skilled in the art, both now and in the future, may make various improvements and enhancements which fall within the scope of the claims which follow.

What is claimed is:

1. A system, comprising:
    memory configured to store predetermined conditions for performing an encryption operation; and
    a processor communicatively coupled to the memory, the processor configured to execute computer readable instructions, to perform a series of acts including:
    determining through analysis of an inbound key and an outbound key of the encryption operation that the encryption operation includes a translation from a first class of encryption to a second class of encryption, the second class of encryption determined to be weaker than the first class of encryption;
        wherein the first class of encryption is one of an advanced encryption standard (AES), data encryption standard (DES) and triple data encryption standard (TDES), and the second class of encryption is another one of the AES, TDES, and DES;
    applying the predetermined conditions to the input key and the output key;
    authorizing the translation via the processor, based on the applying, when aspects of the predetermined conditions are satisfied; and
    performing the translation, wherein the translation includes determining a cipher block size defined by the second class of encryption, to adjust padding of a cipher block of a cipher text based on the cipher block size defined by the second class of encryption and based on inbound or outbound padding method information provided to the processor.

2. The system of claim 1, wherein the computer readable instructions further include performing the translation from the first class of encryption to the second class of encryption.

3. The system of claim 1, wherein the computer readable instructions further include:
    transmitting an error signal, based on the applying, when aspects of the predetermined conditions are not satisfied;
    wherein one of the aspects indicates a length of the outbound key.

4. The system of claim 1, wherein determining whether the translation is permitted includes determining states of access control points which define permitted types of translation operations.

5. The system of claim 4, wherein one of the aspects of the predetermined conditions includes the states of the access control points.

6. A computer program product comprising a computer readable storage medium having program instructions embodied therewith, wherein the computer readable storage medium is not a transitory signal per se, the program instructions executable by a computer processor to cause the computer processor to perform a method comprising:
    determining through analysis of an inbound key and an outbound key of an encryption operation that the encryption operation includes a translation from a first class of encryption to a second class of encryption, the second class of encryption determined to be weaker than the first class of encryption;
        wherein the first class of encryption is one of an advanced encryption standard (AES), data encryption standard (DES) and triple data encryption standard (TDES), and the second class of encryption is another one of the AES, TDES, and DES;
    applying predetermined conditions to the input key and the output key;
    authorizing the translation, based on the applying, when aspects of the predetermined conditions are satisfied;
    performing the translation, wherein the translation includes determining a cipher block size defined by the second class of encryption, to adjust padding of a cipher block of a cipher text based on the cipher block size defined by the second class of encryption and based on inbound or outbound padding method information provided to the processor.

7. The computer program product of claim 6, wherein the program instructions are further executable to perform:
    executing the translation from the first class of encryption to the second class of encryption.

8. The computer program product of claim 6, wherein the program instructions are further executable to perform:
    transmitting an error signal, based on the applying, when aspects of the predetermined conditions are not satisfied;
    wherein one of the aspects indicates a length of the outbound key.

9. The computer program product of claim 6, wherein determining whether the translation is permitted includes determining states of access control points which define permitted types of translation operations, and one of the aspects of the predetermined conditions includes the states of the access control points.

10. A method, comprising:
determining, via computer processor, through analysis of an inbound key and an outbound key of an encryption operation that the encryption operation includes a translation from a first class of encryption to a second class of encryption, the second class of encryption determined to be weaker than the first class of encryption;
wherein the first class of encryption is one of an advanced encryption standard (AES), data encryption standard (DES) and triple data encryption standard (TDES), and the second class of encryption is another one of the AES, TDES, and DES;
applying predetermined conditions to the input key and the output key; and
authorizing the translation via the computer processor, based on the applying, when aspects of the predetermined conditions are satisfied;
performing the translation, wherein the translation includes determining a cipher block size defined by the second class of encryption, to adjust padding of a cipher block of a cipher text based on the cipher block size defined by the second class of encryption and based on inbound or outbound padding method information provided to the processor.

11. The method of claim 10, further comprising:
executing the translation from the first class of encryption to the second class of encryption.

12. The method of claim 10, further comprising:
transmitting an error signal, based on the applying, when aspects of the predetermined conditions are not satisfied;
wherein one of the aspects indicates a length of the outbound key.

13. The method of claim 10, wherein determining whether the translation is permitted includes determining states of access control points which define permitted types of translation operations.

14. The method of claim 13, wherein one of the aspects of the predetermined conditions includes the states of the access control points.

* * * * *